(12) United States Patent
Stathakis et al.

(10) Patent No.: US 11,424,872 B2
(45) Date of Patent: Aug. 23, 2022

(54) HARQ PID SIGNALING FOR SPS UL

(71) Applicant: TELEFONAKTIEBOLAGET LM ERICSSON (PUBL), Stockholm (SE)

(72) Inventors: Efthymios Stathakis, Stockholm (SE); Zhenhua Zou, Solna (SE); Gustav Wikström, Täby (SE); Ali Behravan, Stockholm (SE); Daniel Larsson, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 164 days.

(21) Appl. No.: 16/638,325

(22) PCT Filed: Aug. 8, 2018

(86) PCT No.: PCT/IB2018/055959
§ 371 (c)(1),
(2) Date: Feb. 11, 2020

(87) PCT Pub. No.: WO2019/030683
PCT Pub. Date: Feb. 14, 2019

(65) Prior Publication Data
US 2020/0252170 A1 Aug. 6, 2020

Related U.S. Application Data

(60) Provisional application No. 62/579,672, filed on Oct. 31, 2017, provisional application No. 62/544,571, filed on Aug. 11, 2017.

(51) Int. Cl.
*H04L 1/18* (2006.01)
*H04L 5/00* (2006.01)

(52) U.S. Cl.
CPC .......... *H04L 1/1893* (2013.01); *H04L 1/1861* (2013.01); *H04L 5/0048* (2013.01)

(58) Field of Classification Search
CPC ....... H04L 1/1822; H04L 1/1893; H04L 1/08; H04L 1/1861; H04L 5/0026;
(Continued)

(56) References Cited

U.S. PATENT DOCUMENTS

2018/0176945 A1* 6/2018 Cao ........................ H04W 72/14
2020/0213043 A1* 7/2020 Hooli .................... H04L 1/1896

OTHER PUBLICATIONS

U.S. Appl. No. 62/446,710, filed Jan. 16, 2017 (Year: 2017) (Year: 2017).*

(Continued)

*Primary Examiner* — Ian N Moore
*Assistant Examiner* — Sun Jong Kim
(74) *Attorney, Agent, or Firm* — Christopher & Weisberg, P.A.

(57) ABSTRACT

A receiving node in a wireless communication network is operable to determining a process identifier for a repeated transmission by allocating, to a transmitting node, a plurality of resources for use with repeated transmissions, receiving a transmission from the transmitting node where the transmission uses at least one resource from the plurality of resources assigned to the transmitting node for use with repeated transmissions, and determining the process identifier for the transmission based on the at least one resource from the plurality of resources for use with repeated transmissions used by the transmission. Related methods and systems are also disclosed.

13 Claims, 6 Drawing Sheets

(58) Field of Classification Search
CPC ....... H04L 5/0048; H04L 5/0091; H04L 1/16;
H04L 1/1864; H04L 72/1268
See application file for complete search history.

(56) References Cited

OTHER PUBLICATIONS

"Discussion on UL grant-free transmission", 3GPP TSG RAN WG1 NR Ad-Hoc#2, Qingdao, P.R. China Jun. 27-30, 2017 (VIVO, R1-1710380) (Year: 2017) (Year: 2017).*
Vivo, "Discussion on UL grant-free transmission", 3GPP TSG RAN WG1 NR Ad-Hoc#2, R1-1710380, Qingdao, P.R. China Jun. 27-30, 2017.
China Telecom, "UL grant-free transmission for URLLC", 3GPP TSG RAN WG1 NR Ad-Hoc#2, R1-1710971, Qingdao, P.R. China Jun. 27-30, 2017.

* cited by examiner

HARQ PID SIGNALING FOR SPS UL

RELATED APPLICATIONS

This application is national phase of PCT Patent Application No. PCT/IB2018/055959, filed Aug. 8, 2018, which claims the benefit of U.S. Provisional Patent Application No. 62/544,571, filed Aug. 11, 2017, entitled "HARQ PID SIGNALING FOR SPS UL," and claims the benefit of U.S. Provisional Patent Application No. 62/579,672, filed Oct. 31, 2017, entitled "HARQ PID SIGNALING FOR SPS UL," the disclosures of which are hereby incorporated herein by reference in their entirety.

TECHNICAL FIELD

The present disclosure relates generally to a method for determining a process identifier for a repeated transmission.

BACKGROUND

In cellular wireless systems, such as Long Term Evolution (LTE) and New Radio (NR) standards in 3GPP, resources for uplink (UL) transmissions are normally scheduled by the network node (evolved or enhanced nodeB (eNB) or NR base station (gNB)). This can be done dynamically, i.e. the eNB schedules the UL transmission per transmission time interval (TTI). Alternatively, this can be done using the semi persistent scheduling (SPS) framework, so that multiple TTIs are granted at the same time, i.e. prior to a data transmission. Configuration of SPS includes periodicity of the grant, allocation and modulation and coding scheme (MCS) in subsequent SPS occasions. Other types of grant-free transmissions can also be envisioned where some or all resources are granted semi-statically to the UE, so that the UE can start transmitting over resources whenever needed without a need to ask for a dynamic grant.

Another related concept in wireless transmission is data retransmission. When the transmission of data fails due to some errors in the channel that cannot be fixed in the decoding, the receiver may ask the transmitter for data retransmission. The retransmission method may simply be transmitting the same data or a better coded data, with lower rate, etc. At the receiver side, the receiver may simply use the new, retransmitted data instead of the old one, or combine them to make a more reliable detection. This is the basis of Hybrid Automatic Repeat Request (HARQ).

LTE uses a synchronous HARQ concept where acknowledging of correctly received data or acknowledging of an erroneous detection (ACK/NACK) has to be sent by the receiver of data at a certain time. In LTE, UE uses the same HARQ process number every 8 TTIs. Retransmission of the data, if needed, with the same HARQ happens every 8 TTIs. Since UE uses specific HARQ process ID at specific subframe, eNB needs to know exactly which HARQ process comes when.

SUMMARY

Systems and methods for determining a process identifier for a repeated transmission are disclosed in order to improve aspects of data retransmission performance in cellular wireless systems. In some embodiments, a method of operation of a first node for determining a process identifier for a repeated transmission includes allocating multiple resources to a transmitting node for use with repeated transmissions and receiving a transmission from the transmitting node where the transmission uses at least one resource from the multiple resources assigned to the transmitting node for use with repeated transmissions. The method also includes determining the process identifier for the transmission based on the at least one resource used by the transmission. In this manner, a unified solution for supporting multiple HARQ processes is provided that might include one or more of the following benefits: would not incur any extra overhead, would support multiplexing of multiple UEs where the capacity increases with increasing transmission bandwidth, and where detection of time, frequency, and/or the code domain is very simple and reliable.

In some embodiments, a method of operating a transmitting node in a wireless communication network for indicating a process identifier for a repeated transmission is disclosed. The method includes receiving an allocation of multiple resources from a receiving node for use with repeated transmissions. The method also includes determining at least one resource from the resources assigned to the receiving node for use with repeated transmissions to use for a transmission based on the process identifier for the transmission and transmitting the transmission to the receiving node.

In some embodiments, a new way to indicate the HARQ process ID for SPS UL is proposed. In some embodiments, a new formula is proposed that takes repetitions into account. In some embodiments, a group of resources is allocated to each UE to indicate the packet number within a repetition sequence. In some embodiments, the resources include one or a combination of resources in the time domain, resources in the frequency domain, and resources in code domain, i.e. demodulation reference signal (DMRS) sequences, corresponding cyclic shift, or orthogonal cover codes.

In some embodiments, the resources for use with repeated transmissions include multiple resources in the time domain. In some embodiments, the resources for use with repeated to transmissions include multiple resources in the frequency domain. In some embodiments, the resources for use with repeated transmissions include multiple resources in the code domain. In some embodiments, the resources in the code domain include demodulation reference signal sequences, corresponding cyclic shifts, and/or orthogonal cover codes. In some embodiments, the resources for use with repeated transmissions include multiple potential waveforms to be used by the transmission.

In some embodiments, the method also includes determining an identity of the transmitting node based on the at least one resource used by the transmission.

In some embodiments, determining the process identifier for the transmission based on the at least one resource includes determining the process identifier for the transmission using a mapping of the at least one resource from the resources assigned to the transmitting node for use with repeated transmissions to the process identifier.

In some embodiments, determining the process identifier for the transmission based on the at least one resource includes determining the process identifier for the transmission using a formula such that results in the same output for all repetitions within the sequence. In some embodiments as described herein in more detail, the formula is:

HARQ PID=floor[($10 \times SFN+Subframe\_nr$)/SPSIntervalUL/$K$]modulo #ConfiULSPS_Processes.

In some embodiments, the formula is:

HARQ PID=floor[SPS UL transmission opportunity counter/$K$]modulo #ConfiULSPS_Processes.

In some embodiments, the receiving node is a network node and the transmitting node is a wireless device. In some embodiments, the receiving node is a gNB and the transmitting node is a UE. In some embodiments, the wireless communication network is a 5G wireless communication network, the process identifier is a HARQ PID, and the repeated transmission is for semi-persistent scheduling with repetition.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

While the LTE standard is based on a synchronous HARQ process, the NR standard that is being specified in 3GPP is based on asynchronous HARQ transmission, which means that there is no certain time that is expected for ACK/NACK. It has further been agreed in NR work item that for an UL transmission scheme with/without grant, K repetitions including initial transmission (K>=1) for the same transport block are supported. One of the main use cases for repetition is Ultra-Reliable Low Latency Communications (URLLC) data, where the target is to enhance the probability of early decoding success.

As such, there is a need for improved determination of a HARQ Process Identification (PID). Such an improved determination is provided by aspects of the systems, devices, and methods described herein.

In some embodiments, a more general term "network node" is used and it can correspond to any type of radio network node or any network node which communicates with a User Equipment (UE) and/or with another network node. Examples of network nodes are a NodeB, an evolved NodeB (eNB), a New Radio (NR) base station (gNB), a base station, a Multi-Standard Radio (MSR) radio node such as an MSR base station, a network controller, a Radio Network Controller (RNC), a Base Station Controller (BSC), a relay, a donor node controlling relay, a Base Transceiver Station (BTS), an Access Point (AP), transmission points, transmission nodes, etc.

In some embodiments the non-limiting term UE or wireless device is used and it refers to any type of wireless device communicating with a network node and/or with another UE in a cellular or mobile communication system. Examples of a UE are a target device, a Device-to-Device (D2D) UE, a machine type UE or a UE capable of Machine-to-Machine (M2M) communication, a Personal Digital Assistant (PDA), an iPad, a tablet, mobile terminals, a smart phone, Laptop Embedded Equipment, Laptop Mounted Equipment, Universal Serial Bus (USB) dongles, a Proximity Service (ProSe) UE, a Vehicle-to-Vehicle (V2V) UE, a Vehicle-to-X (V2X) UE, etc.

Figure 1:
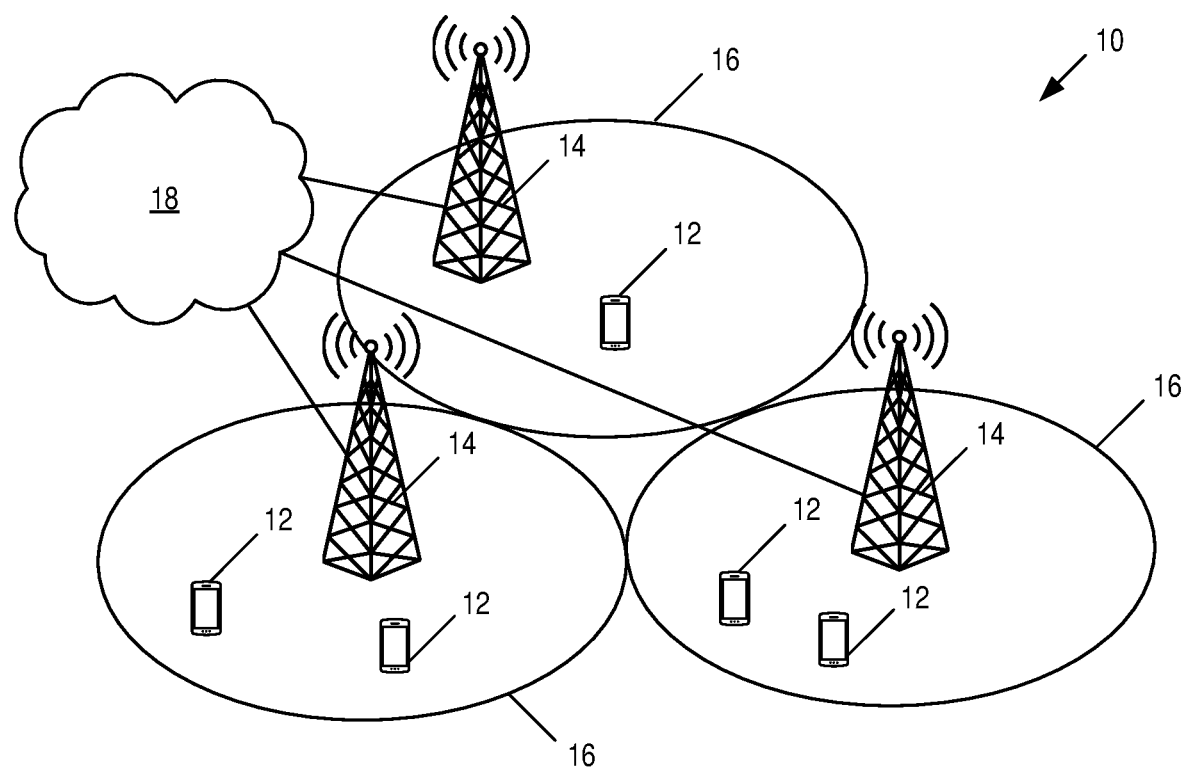
FIG. 1 illustrates one example of a wireless communication network, according to some embodiments of the present disclosure.

FIG. 1 illustrates one example of a wireless communication network 10 (e.g., an LTE (e.g., LTE Advanced (LTE-A), LTE-Pro, or an enhanced version of LTE) or Fifth Generation (5G) NR network) in which embodiments of the present disclosure may be implemented to provide for asynchronous HARQ processes. As illustrated, a number of wireless devices 12 (e.g., UEs) wirelessly transmit signals to and receive signals from radio access nodes 14 (e.g., eNBs or gNBs, which is a 5G NR base station), each serving one or more cells 16. The radio access nodes 14 are connected to a core network 18 that includes one or more core network nodes (not shown).

The NR standard that is being specified in 3GPP is based on asynchronous Hybrid Automatic Repeat Request (HARQ) transmission, which means that there is no certain time that is expected for ACK/NACK. It has further been agreed in NR work item that for a UL transmission scheme with/without grant, K repetitions including initial transmission (K>=1) for the same transport block are supported. One of the main use cases for repetition is Ultra-Reliable Low Latency Communications (URLLC) data, where the target is to enhance the probability of early decoding success.

In Semi Persistent Scheduling (SPS) Uplink (UL), without repetition the network can infer the HARQ process ID (PID) by a formula that is based on the absolute System Frame Number ("SFN") and subframe number ("SubFN"). These two elements are known at both sides of the network hence the information is implicitly conveyed at the eNB/gNB 14. The formula is further based on the SPS interval on the UL ("SPSInt") and the number of UL SPS processes that have been configured ("#Processes"). The formula that is used for LTE SPS is given below.

$$\text{HARQ PID} = \text{floor}[(10*SFN + SubFN)/SPSInt]\% \#Processes \qquad (1)$$

However, when repetition is configured then the network can no longer use this formula to infer the HARQ PID because it will receive (repeated) copies of the same packet in different subframes. Therefore, the network cannot find out the HARQ PID based on the subframe that conveys the packet.

An alternative is to send the PID in the Physical Uplink Shared Channel (PUSCH) transmission but this will: a) increase the overhead; b) limit the opportunity to multiplex UEs 12 and c) render the HARQ PID decoding more prone to errors. As such, there is a need for improved determination of a HARQ PID.

Systems and methods for determining a process identifier for a repeated transmission are disclosed. In some embodiments, a method of operation of a first node for determining a process identifier for a repeated transmission includes allocating multiple resources to a transmitting node for use with repeated transmissions and receiving a transmission from the transmitting node where the transmission uses at least one resource from the multiple resources assigned to the transmitting node for use with repeated transmissions. The method also includes determining the process identifier for the transmission based on the at least one resource used by the transmission. In this manner, a unified solution for supporting multiple HARQ processes is provided that might include one or more of the following benefits: would not incur any extra overhead, would support multiplexing of multiple UEs 12 where the capacity increases with increasing transmission bandwidth, and where detection of time, frequency, and/or the code domain is very simple and reliable.

In order to increase the clarity of the following discussion, the terms transmitting node and receiving node are used. These refer to a node that is transmitting the transmission being discussed and the node receiving the transmission being discussed, respectively. In some of the UL examples discussed herein, it is assumed that a network node such as a gNB 14 is the receiving node and a wireless device such as a UE 12 is the transmitting node. However, the embodiments disclosed herein are applicable to other transmitting and receiving situations and can even be applied to the gNB 14 and the UE 12 is reverse when determining downlink transmissions.

Figure 2:
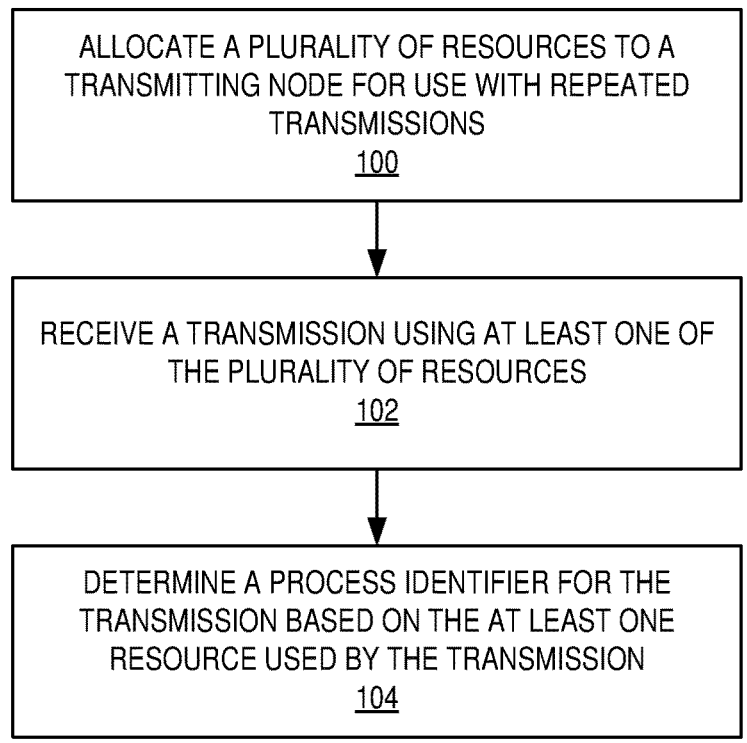
FIG. 2 is a flow chart that illustrates the operation of a receiving node according to some embodiments of the present disclosure.

FIG. 2 is a flow chart that illustrates the operation of a receiving node according to some embodiments of the present disclosure. As discussed in more detail below, the receiving node first allocates a plurality of resources to a transmitting node for use with repeated transmissions (step 100). Then the receiving node receives a transmission from the transmitting node where the transmission uses at least one resource from the plurality of resources assigned to the transmitting node for use with repeated transmissions (step 102). The receiving node is then able to determine the process identifier for the transmission based on the at least one resource from the plurality of resources assigned to the transmitting node for use with repeated transmissions used by the transmission (step 104). As discussed above, in this manner, a unified solution for supporting multiple HARQ processes is provided that might include one or more of the following benefits: would not incur any extra overhead, would support multiplexing of multiple UEs where the capacity increases with increasing transmission bandwidth, and where detection of time, frequency, and/or the code domain is very simple and reliable.

Figure 3:
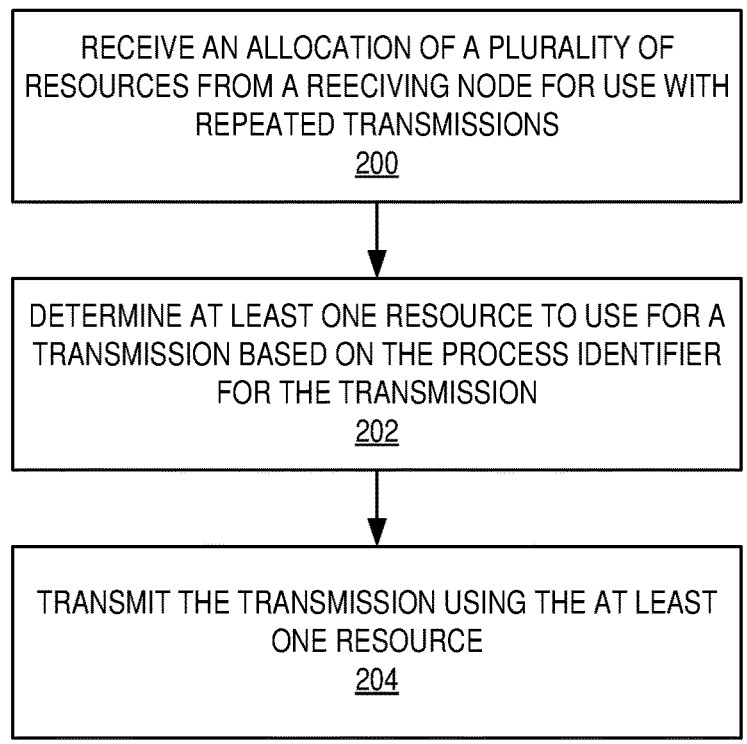
FIG. 3 is a flow chart that illustrates the operation of a transmitting node according to some embodiments of the present disclosure.

FIG. 3 is a flow chart that illustrates the operation of a transmitting node according to some embodiments of the present disclosure. As discussed in more detail below, the transmitting node first receives an allocation of a plurality of resources from a receiving node for use with repeated transmissions (step 200). Then the transmitting node determines at least one resource from the plurality of resources assigned to the receiving node for use with repeated transmissions to use for a transmission based on the process identifier for the transmission (step 202). Finally, the transmitting node transmits the transmission to the receiving node where the transmission uses the at least one resource from the plurality of resources assigned to the transmitting node for use with repeated transmissions (step 204). As discussed above, in this manner, a unified solution for supporting multiple HARQ processes is provided that might include one or more of the following benefits: would not incur any extra overhead, would support multiplexing of multiple UEs where the capacity increases with increasing transmission bandwidth, and where detection of time, frequency, and/or the code domain is very simple and reliable.

Figure 4:
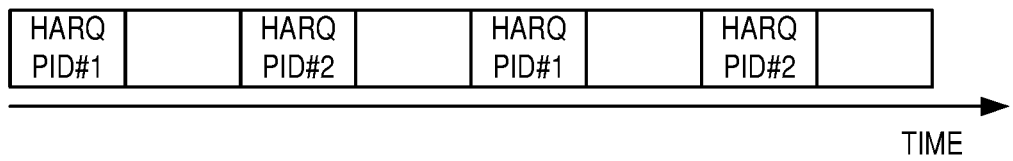
FIG. 4 illustrates packets with different Hybrid Automatic Repeat Request (HARQ) Process Identifications (PIDs) that are transmitted in different time resources according to some embodiments of the present disclosure.

According to some embodiments, a group of resources is allocated to each UE 12 to indicate the packet number within a repetition sequence. In some embodiments, the resources include one or a combination of resources in time domain. In this configuration, packets with different HARQ PIDs are transmitted during certain times. For example, FIG. 4 illustrates packets with different HARQ PIDs are transmitted in different time resources according to some embodiments of the present disclosure. In FIG. 4 every other time resource is used for UL transmission of a certain UE 12, and packets with HARQ PID #1 are transmitted on every fourth time resource.

Figure 5:
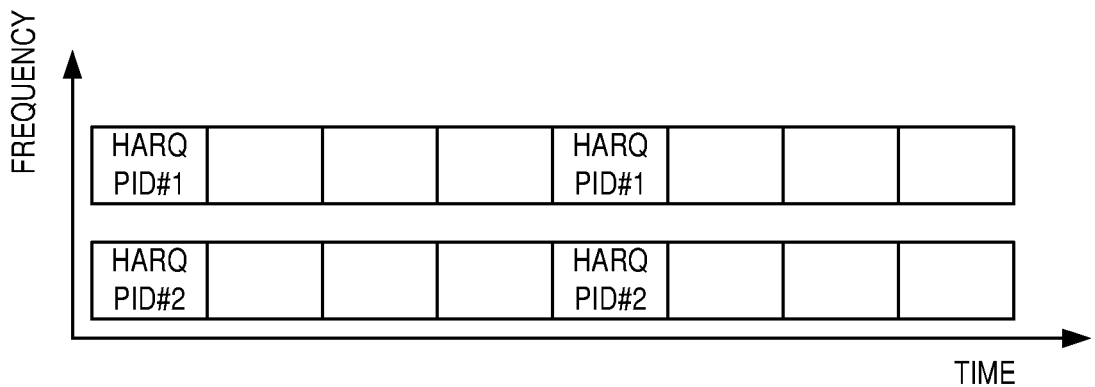
FIG. 5 illustrates packets with different HARQ PIDs that are transmitted in different frequency resources according to some embodiments of the present disclosure.

In some embodiments, the resources include resources in frequency domain. In this configuration, packets with different HARQ PIDs are transmitted during certain times. FIG. 5 illustrates packets with different HARQ PIDs are transmitted in different frequency resources according to some embodiments of the present disclosure. In the example of FIG. 5, different resources in frequency are used for HARQ PID #1 and HARQ PID #2. The resource may be partly overlapping in frequency domain.

In some embodiments, the resources include resources in code domain, i.e. DMRS sequences, corresponding cyclic shift, or orthogonal cover codes. Another aspect to consider could further be the waveform that is used for transmission. In some configurations of the first embodiment, the time/frequency/code resources can be used for UE identification together with implying HARQ PID.

The mapping between the resources and the HARQ PID can be a simple mapping such that using certain time/frequency/code in the UL transmission, implies a certain HARQ PID.

Alternatively, the mapping can be based on a formula. The formula includes the number of repetitions K and it should yield the same output for all repetitions within the sequence. Then, a formula that fulfills this requirement is the following:

$$\text{HARQ PID}=\text{floor}[(10*SFN+SubFN)/SPSInt/K]\% \#\text{Processes} \quad (2)$$

In one embodiment the formula is instead directly based on a counter of the SPS UL transmission opportunities ("TxOpCount"), which is applicable also for TDD:

$$\text{HARQ PID}=\text{floor}[TxOpCount/K]\% \#\text{Processes} \quad (3)$$

For ease of illustration, let us assume that K=3 and that we have 2 HARQ processes. Then, the transmission pattern shown in FIG. 6 may occur.

The receiver needs to distinguish the packet number within the repetition sequence. This can be addressed by assigning L CSs, L=K, to the UE. If we have three CSs for the k-th UE with indices $CS\_0\hat{}k$, $CS\_1\hat{}k$, $CS\_2\hat{}k$ then by detecting the CS index the eNB/gNB 14 can infer the transmission sequence number. This can be achieved by mapping $CS\_1\hat{}k, l=1, 2, 3$ to the packet sequence number. By detecting the CS index the RX knows if it received the initial packet or a repetition.

In some embodiments, each CS corresponds to one sequence number in the repetition, i.e., a particular starting time of the repetition sequence.

If L=K CSs are allocated, then UE can start the transmission at any time, i.e., this corresponds to the above figure.

If L<K CSs are allocated, then UE cannot start the transmission at any time it wants. In the extreme case that L=1, the UE can only start the transmission at a fixed position.

Figure 6:
FIG. 6 illustrates an example transmission pattern according to some embodiments of the present disclosure.

Using the example of FIG. 6, three CSs (CS 0—corresponding to tx at k; CS 1—corresponding to tx at k+1; and CS 2—corresponding to tx at k+2) can be allocated. If only CS0 and CS2 are allocated, then UE cannot start the transmission at time k+1.

In the above description, formula (3) is presented to consider the repetition K and the TDD case in which a counter of the SPS UL transmission opportunities is used.

Moreover, a group of orthogonal resources is allocated to each UE to indicate the sequence number within a repetition sequence. More specifically, a corresponding cyclic shift for DMRS is allocated.

In the accompanying description, it is explained that if the number of repetition is K, then L=K CSs are allocated. It is also explained that less than K cyclic shifts to a UE can be allocated, but all sequence number is detected by means of blind detection.

The above description further elaborates the scheme where L<K CSs are allocated, and a corresponding UE method.

In one embodiment, the UE is explicitly assigned the sequence of K cyclic shifts or orthogonal cover code. The indication can be done in an L1 activation message such as the SPS activation message, or in a higher layer configuration message, such as the SPS configuration.

In another embodiment, the cyclic shifts or orthogonal cover code are assigned to the UEs, which share the same resources in a combed-like way. That is, a single CS index i_0 is assigned for each UE and it infers the rest K−1 indices, e.g., select i_0 as i_k=i_0+(k−1)M, where M is the number of supported UEs.

In another embodiment, the cyclic shifts or orthogonal cover code are assigned to the UEs, which share the same resources, as a continuous batch. That is, a single CS index i_(0,1) is assigned for the first UE and it infers the rest K−1 indices, e.g., select i_(k,l)=i_0,1+(k−1), while the m-th UE select its first indices as i_(0,m)=i_(K−1,m−1)+1 and the rest k−1 indices as i_(k,m)=i_(0,m)+(k−1).

In some configurations it may be sufficient to configure fewer than K cyclic shifts or orthogonal cover codes to a UE, and by means of blind detection determine in the receiver which sequence number, and therefrom the HARQ PID, is the most likely one for a received transmission.

In one embodiment, the determined sequence index is used in the receiver to improve the reception quality. By knowing the expected number of repetitions in a sequence, the receiver can combine the soft values from the appropriate data transmissions by being able to decode the DMRS CS index.

In some embodiments the methods disclosed herein can be applied to the case of autonomous UL, where multiple UEs 12 are given or configured with UL grants, but it is not deterministic which UE 12 uses the grant in a given transmission opportunity. By assigning DMRS CSs that indicate different HARQ PIDs, and in one set of configurations also different UEs 12, the UE 12 is able to communicate both its identity and the identifier of the data (e.g., retransmission or new data).

Figure 7:
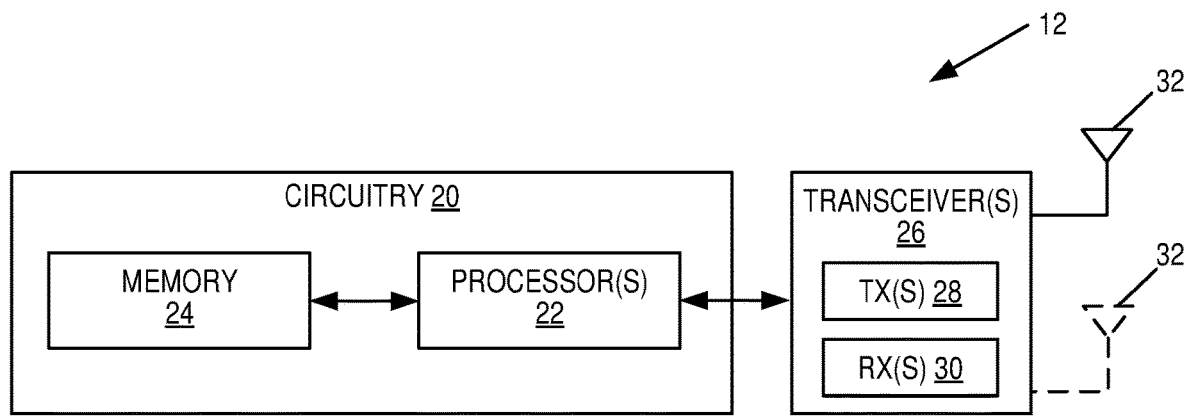
FIGS. 7 and 8 illustrate example embodiments of a wireless device.

FIG. 7 is a schematic block diagram of the wireless device 12 according to some embodiments of the present disclosure. One example of the wireless device is the UE 12 as described herein. In some embodiments, the wireless device 12 is not associated with a particular end user. As illustrated, the wireless device 12 includes circuitry 20 comprising one or more processors 22 (e.g., Central Processing Units (CPUs), Application Specific Integrated Circuits (ASICs), Field Programmable Gate Arrays (FPGAs), Digital Signal Processors (DSPs), and/or the like) and memory 24. The wireless device 12 also includes one or more transceivers 26 each including one or more transmitters 28 and one or more receivers 30 coupled to one or more antennas 32. In some embodiments, the functionality of the wireless device 12 described herein may be implemented in hardware (e.g., via hardware within the circuitry 20 and/or within the processor(s) 22) or be implemented in a combination of hardware and software (e.g., fully or partially implemented in software that is, e.g., stored in the memory 24 and executed by the processor(s) 22).

In some embodiments, a computer program including instructions which, when executed by the at least one processor 22, causes the at least one processor 22 to carry out at least some of the functionality of the wireless device 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 8:
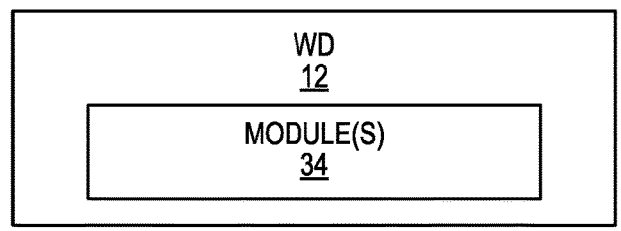

FIG. 8 is a schematic block diagram of the wireless device 12 (e.g., UE) according to some other embodiments of the present disclosure. The wireless device 12 includes one or more modules 34, each of which is implemented in software. The module(s) 34 provide the functionality of the wireless device 12 described herein.

Figure 9:
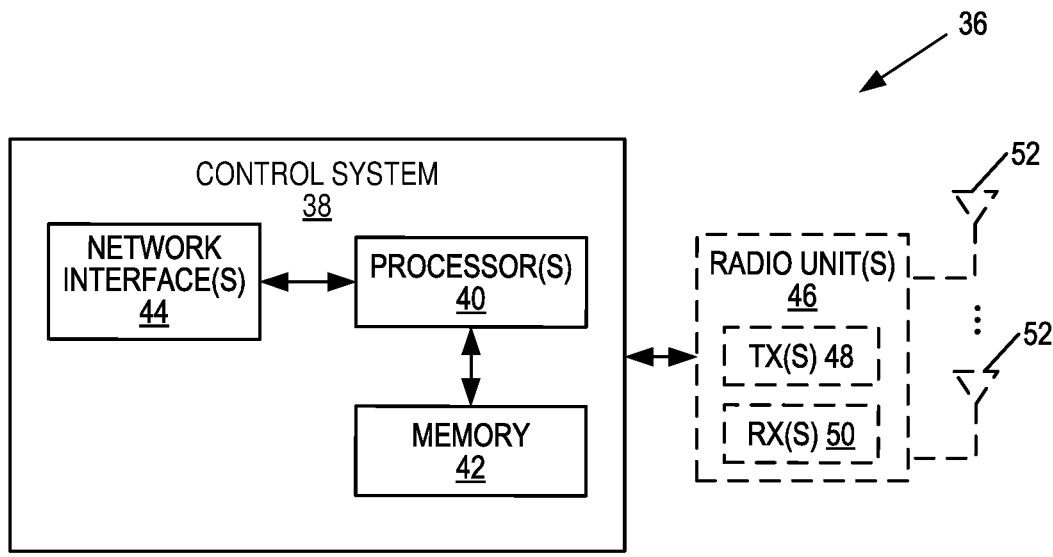
FIGS. 9, 10, and 11 illustrate example embodiments of a network node.

FIG. 9 is a schematic block diagram of a network node 36 (e.g., a radio access node 14 such as, for example, an eNB or gNB or a core network node) according to some embodiments of the present disclosure. As illustrated, the network node 36 includes a control system 38 that includes circuitry comprising one or more processors 40 (e.g., CPUs, ASICs, DSPs, FPGAs, and/or the like) and memory 42. The control system 38 also includes a network interface 44. In embodiments in which the network node 36 is a radio access node 14, the network node 36 also includes one or more radio units 46 that each include one or more transmitters 48 and one or more receivers 50 coupled to one or more antennas 52. In some embodiments, the functionality of the network node 36 (specifically the functionality of the radio access node 14) described above may be fully or partially implemented in software that is, e.g., stored in the memory 42 and executed by the processor(s) 40.

Figure 10:
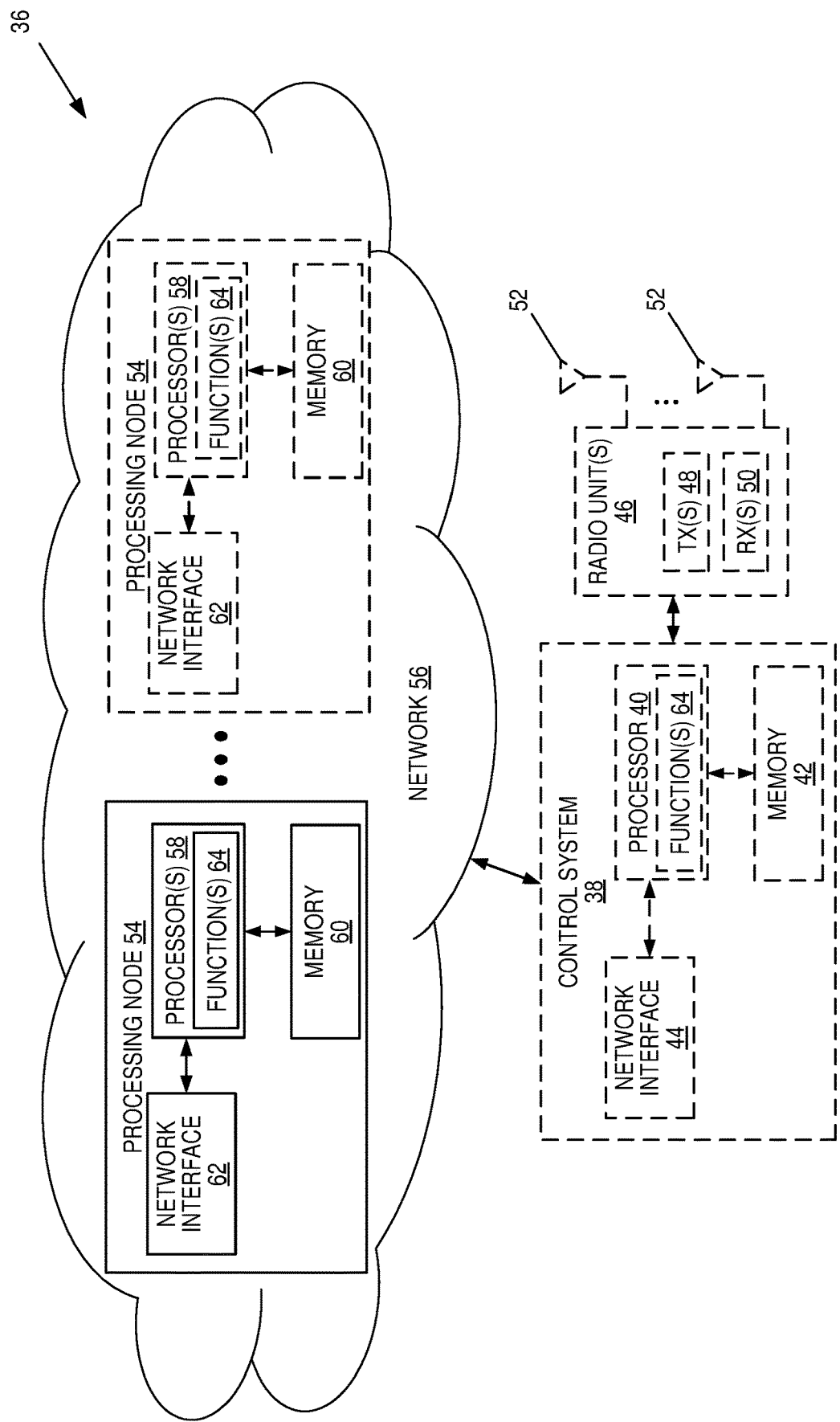

FIG. 10 is a schematic block diagram that illustrates a virtualized embodiment of the network node 36 (e.g., the radio access node 14 or a core network node) according to some embodiments of the present disclosure. As used herein, a "virtualized" network node 36 is a network node 36 in which at least a portion of the functionality of the network node 36 is implemented as a virtual component (e.g., via a virtual machine(s) executing on a physical processing node(s) in a network(s)). As illustrated, the network node 36 optionally includes the control system 38, as described with respect to FIG. 9. In addition, if the network node 36 is the radio access node 14, the network node 36 also includes the one or more radio units 46, as described with respect to FIG. 9. The control system 38 (if present) is connected to one or more processing nodes 54 coupled to or included as part of a network(s) 56 via the network interface 44. Alternatively, if the control system 38 is not present, the one or more radio units 46 (if present) are connected to the one or more processing nodes 54 via a network interface(s). Alternatively, all of the functionality of the network node 36 (e.g., all of the functionality of the radio access node 14 or the core network node 19) described herein may be implemented in the processing nodes 54. Each processing node 54 includes one or more processors 58 (e.g., CPUs, ASICs, DSPs, FPGAs, and/or the like), memory 60, and a network interface 62.

In this example, functions 64 of the network node 36 (e.g., the functions of the radio access node 14 or the core network node 18) described herein are implemented at the one or more processing nodes 54 or distributed across the control system 38 (if present) and the one or more processing nodes 54 in any desired manner. In some particular embodiments, some or all of the functions 64 of the network node 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 (if present) or alternatively the radio unit(s) 46 (if present) is used in order to carry out at least some of the desired functions. Notably, in some embodiments, the control system 38 may not be included, in which case the radio unit(s) 46 (if present) communicates directly with the processing node(s) 54 via an appropriate network interface(s).

In some particular embodiments, higher layer functionality (e.g., layer 3 and up and possibly some of layer 2 of the protocol stack) of the network node 36 may be implemented at the processing node(s) 54 as virtual components (i.e., implemented "in the cloud") whereas lower layer functionality (e.g., layer 1 and possibly some of layer 2 of the protocol stack) may be implemented in the radio unit(s) 46 and possibly the control system 38.

In some embodiments, a computer program including instructions which, when executed by the at least one processor 40, 58, causes the at least one processor 40, 58 to carry out the functionality of the network node 36 or a processing node 54 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 60).

Figure 11:
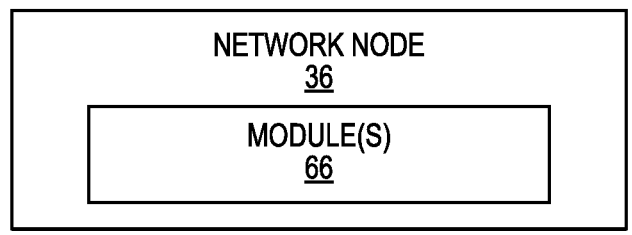

FIG. 11 is a schematic block diagram of the network node 36 (e.g., the radio access node 14 or a core network node) according to some other embodiments of the present disclosure. The network node 36 includes one or more modules 66, each of which is implemented in software. The module(s) 66 provide the functionality of the network node 36 described herein.

The following acronyms are used throughout this disclosure.

3GPP Third Generation Partnership Project
5G Fifth Generation
ACK Acknowledgement
AP Access Point
ASIC Application Specific Integrated Circuits
BSC Base Station Controller
BTS Base Transceiver Station
CPU Central Processing Unit
CS Cyclic Shift
D2D Device-to-Device
DMRS Demodulation Reference Signal
DSP Digital Signal Processors
eNB Evolved or Enhanced NodeB
FPGA Field Programmable Gate Array
gNB New Radio Base Station
HARQ Hybrid Automatic Repeat Request
LTE Long Term Evolution
LTE-A LTE Advanced
M2M Machine-to-Machine
MCS Modulation and Coding Scheme
MSR Multi-Standard Radio
NACK Negative Acknowledgement
NR New Radio
OCC Orthogonal Cover Codes
PDA Personal Digital Assistant
PID Process ID
ProSe Proximity Service
PUSCH Physical Uplink Shared Channel
RNC Radio Network Controller
SFN System Frame Number
SPS Semi Persistent Scheduling
TTI Transmission Time Interval
UE User Equipment
UL Uplink
URLLC Ultra-Reliable Low Latency Communication
USB Universal Serial Bus
V2V Vehicle-to-Vehicle
V2X Vehicle-to-X Those skilled in the art will recognize improvements and modifications to the embodiments of the present disclosure. All such improvements and modifications are considered within the scope of the concepts disclosed herein.

What is claimed is:

1. A method of operating a receiving node in a wireless communication network for determining a process identifier for a repeated transmission, comprising:
   allocating, to a transmitting node, a plurality of resources for use with repeated transmissions, the plurality of resources for use with repeated transmissions comprising a plurality of resources in the code domain and the plurality of resources in the code domain comprising one or more of the group consisting of demodulation reference signal sequences, corresponding cyclic shifts, and orthogonal cover codes;
   receiving a transmission from the transmitting node where the transmission uses at least one resource from the plurality of resources assigned to the transmitting node for use with repeated transmissions; and
   determining the process identifier for the transmission based on the at least one resource from the plurality of resources assigned to the transmitting node for use with repeated transmissions used by the transmission, the process identifier being determined based on the following:

process identifier=floor[TxOpCount/$K$]modulo #Processes, modulo being the whole number remainder of floor [TxOpCount/K] divided by #Processes, TxOpCount being a counter of semi-persistent scheduling uplink transmission opportunities, K being a number of repetitions and #Processes being a number of uplink semi-persistent processes that have been configured.

2. The method of claim 1, wherein the plurality of resources for use with repeated transmissions comprises a plurality of resources in the time domain.

3. The method of claim 1, wherein the plurality of resources for use with repeated transmissions comprises a plurality of resources in the frequency domain.

4. The method of claim 1, wherein the plurality of resources for use with repeated transmissions comprises a plurality of potential waveforms to be used by the transmission.

5. The method of claim 1, further comprising determining an identity of the transmitting node based on the at least one resource from the plurality of resources assigned to the transmitting node for use with repeated transmissions used by the transmission.

6. The method of claim 1, wherein determining the process identifier for the transmission based on the at least one resource from the plurality of resources assigned to the transmitting node for use with repeated transmissions used by the transmission comprises:
    determining the process identifier for the transmission using a mapping of the at least one resource from the plurality of resources assigned to the transmitting node for use with repeated transmissions to the process identifier.

7. A method of operating user equipment in a wireless communication network for indicating a process identifier for a repeated transmission, comprising:
    receiving an allocation of a plurality of resources from a receiving node for use with repeated transmissions, the plurality of resources for use with repeated transmissions comprising a plurality of resources in the code domain and the plurality of resources in the code domain comprising one or more of the group consisting of demodulation reference signal sequences, corresponding cyclic shifts, and orthogonal cover codes;
    determining at least one resource from the plurality of resources assigned to the receiving node for use with repeated transmissions to use for a transmission based on the process identifier for the transmission, the process identifier being determined based on the following:

process identifier=floor[TxOpCount/*K*]modulo #Processes, modulo being the whole number remainder of floor [TxOpCount/K] divided by #Processes, TxOpCount being a counter of semi-persistent scheduling uplink transmission opportunities, K being a number of repetitions and #Processes being a number of uplink semi-persistent processes that have been configured; and
    transmitting the transmission to the receiving node where the transmission uses the at least one resource from the plurality of resources assigned to the user equipment for use with repeated transmissions.

8. The method of claim 7, wherein the plurality of resources for use with repeated transmissions comprises a plurality of resources in the time domain.

9. The method of claim 7, wherein the plurality of resources for use with repeated transmissions comprises a plurality of resources in the frequency domain.

10. The method of claim 7, wherein the plurality of resources for use with repeated transmissions comprises a plurality of potential waveforms to be used by the transmission.

11. The method of claim 7, wherein determining the at least one resource from the plurality of resources assigned to the receiving node for use with repeated transmissions to use for the transmission comprises:
    determining the at least one resource from the plurality of resources assigned to the receiving node for use with repeated transmissions to use for a transmission based on the process identifier for the transmission based on the process identifier for the transmission and an identity of the user equipment.

12. The method of claim 7, wherein determining the at least one resource from the plurality of resources assigned to the user equipment for use with repeated transmissions to use comprises:
    determining the at least one resource for the transmission using a mapping of the at least one resource from the plurality of resources assigned to the user equipment for use with repeated transmissions to the process identifier.

13. A wireless device, comprising:
    a transceiver for communication with a wireless communication network; and
    a processing device in communication with a memory having instructions stored thereon, that when executed by the processing device causes the processing device to perform operations comprising:
        receiving an allocation of a plurality of resources from a receiving node for use with repeated transmissions, the plurality of resources for use with repeated transmissions comprising a plurality of resources in the code domain and the plurality of resources in the code domain comprising one or more of the group consisting of demodulation reference signal sequences, corresponding cyclic shifts, and orthogonal cover codes;
        determining at least one resource from the plurality of resources assigned to the receiving node for use with repeated transmissions to use for a transmission based on a process identifier for the transmission, the process identifier being determined based on the following:

process identifier=floor[TxOpCount/*K*]modulo #Processes, modulo being the whole number remainder of floor [TxOpCount/K] divided by #Processes, TxOpCount being a counter of semi-persistent scheduling uplink transmission opportunities, K being a number of repetitions and #Processes being a number of uplink semi-persistent processes that have been configured; and
    transmitting the transmission to the receiving node where the transmission uses the at least one resource from the plurality of resources assigned to the wireless device for use with repeated transmissions.

* * * * *